United States Patent
Yamaguchi et al.

(10) Patent No.: US 7,474,905 B2
(45) Date of Patent: Jan. 6, 2009

(54) WEIGHT DETERMINING APPARATUS, A WEIGHT DETERMINATION METHOD, A RADIATION POWER MEASURING APPARATUS, AND A RADIATION POWER MEASURING METHOD

(75) Inventors: Ryo Yamaguchi, Kanagawa (JP); Shinji Uebayashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 269 days.

(21) Appl. No.: 11/127,222

(22) Filed: May 12, 2005

(65) Prior Publication Data
US 2005/0276312 A1 Dec. 15, 2005

(30) Foreign Application Priority Data
May 12, 2004 (JP) ............................ 2004-142717
Jun. 9, 2004 (JP) ............................ 2004-171820

(51) Int. Cl.
*H04M 1/00* (2006.01)

(52) U.S. Cl. .............. 455/562.1; 455/67.11; 455/575.7; 455/101; 455/63.1; 342/373; 342/378; 343/700 MS; 343/890; 370/252; 370/329; 370/335

(58) Field of Classification Search .............. 455/562.1, 455/11.1, 62, 67.11, 575.7, 101; 370/252, 370/335, 346, 328, 329
See application file for complete search history.

(56) References Cited

U.S. PATENT DOCUMENTS

| | | | | |
|---|---|---|---|---|
| 5,339,087 A | * | 8/1994 | Minarik ........................ | 342/375 |
| 5,907,816 A | * | 5/1999 | Newman et al. .......... | 455/562.1 |
| 5,973,638 A | * | 10/1999 | Robbins et al. .............. | 342/172 |
| 6,085,076 A | * | 7/2000 | Lindsay et al. ............ | 455/277.1 |
| 6,108,323 A | * | 8/2000 | Gray .......................... | 370/335 |
| 6,167,286 A | * | 12/2000 | Ward et al. ................ | 455/562.1 |
| 6,198,435 B1 | * | 3/2001 | Reudink et al. ............. | 342/373 |
| 6,218,988 B1 | * | 4/2001 | Maruta ........................ | 342/378 |
| 6,236,363 B1 | * | 5/2001 | Robbins et al. ............. | 342/360 |
| 6,246,674 B1 | * | 6/2001 | Feuerstein et al. .......... | 370/334 |
| 6,393,303 B1 | * | 5/2002 | Katz ........................ | 455/562.1 |

(Continued)

FOREIGN PATENT DOCUMENTS

EP 0 838 911 A2 4/1998

(Continued)

OTHER PUBLICATIONS

Tomoaki Nishikido, et al., "An Antenna System with Two Parallel Elements and a Dividing Feed Circuit for a Handy Phone", Shin-gaku Society Convention B-1-190, 2003, p. 190.

(Continued)

*Primary Examiner*—Marceau Milord
(74) *Attorney, Agent, or Firm*—Oblon, Spivak, McClelland, Maier & Neustadt, P.C.

(57) ABSTRACT

A weight determining apparatus is disclosed. The weight determining apparatus includes two or more antenna elements that receive a test wave transmitted by one or more test wave sources prepared outside of a phantom that simulates an object that attenuates a radio wave, the antenna elements being prepared in a mobile terminal. The weight determining apparatus further includes a weight determining unit that determines weights for the antenna elements such that a signal received by the antenna elements as a whole may be maximized.

5 Claims, 11 Drawing Sheets

U.S. PATENT DOCUMENTS

| | | | |
|---|---|---|---|
| 6,553,012 B1 * | 4/2003 | Katz | 370/328 |
| 6,901,062 B2 * | 5/2005 | Scherzer et al. | 370/335 |
| 6,917,337 B2 * | 7/2005 | Iida et al. | 343/702 |
| 7,113,748 B2 * | 9/2006 | Shapira et al. | 455/63.4 |
| 7,130,663 B2 * | 10/2006 | Guo | 455/562.1 |
| 7,272,359 B2 * | 9/2007 | Li et al. | 455/67.13 |
| 7,286,802 B2 * | 10/2007 | Beyme et al. | 455/67.14 |
| 7,321,636 B2 * | 1/2008 | Harel et al. | 375/299 |
| 7,327,800 B2 * | 2/2008 | Oprea et al. | 375/267 |
| 7,348,919 B2 * | 3/2008 | Gounalis | 342/165 |
| 2003/0008620 A1 | 1/2003 | Rowell et al. | |
| 2003/0031234 A1 | 2/2003 | Smee et al. | |
| 2003/0097068 A1 | 5/2003 | Hossack | |

FOREIGN PATENT DOCUMENTS

| | | | |
|---|---|---|---|
| EP | 0 986 193 A1 | 3/2000 | |
| WO | WO 01/81932 A2 | 11/2001 | |

OTHER PUBLICATIONS

Ryo Yamaguchi, et al., "Improvement of Radiation Efficiency for Mobile Handsets by using Distributed Feed", Shin-gaku Society convention B-4-4, 2003, p. 312.

Masao Sakuma, et al., "A study on the measurement of a radiation efficiency for small antennas", Electricity-related Academic Conference Hokkaido Branch Union Convention, Fiscal year Heisei 12, vol. E80-B, No. 5, 1999, p. 202.

Qiang Chen, et al., Measurement of Power Absorption by Human Model in the Vicinity of Antennas, IEICE Trans. Commun., vol. E80-B, No. 5, May 1997, pp. 709-711.

* cited by examiner

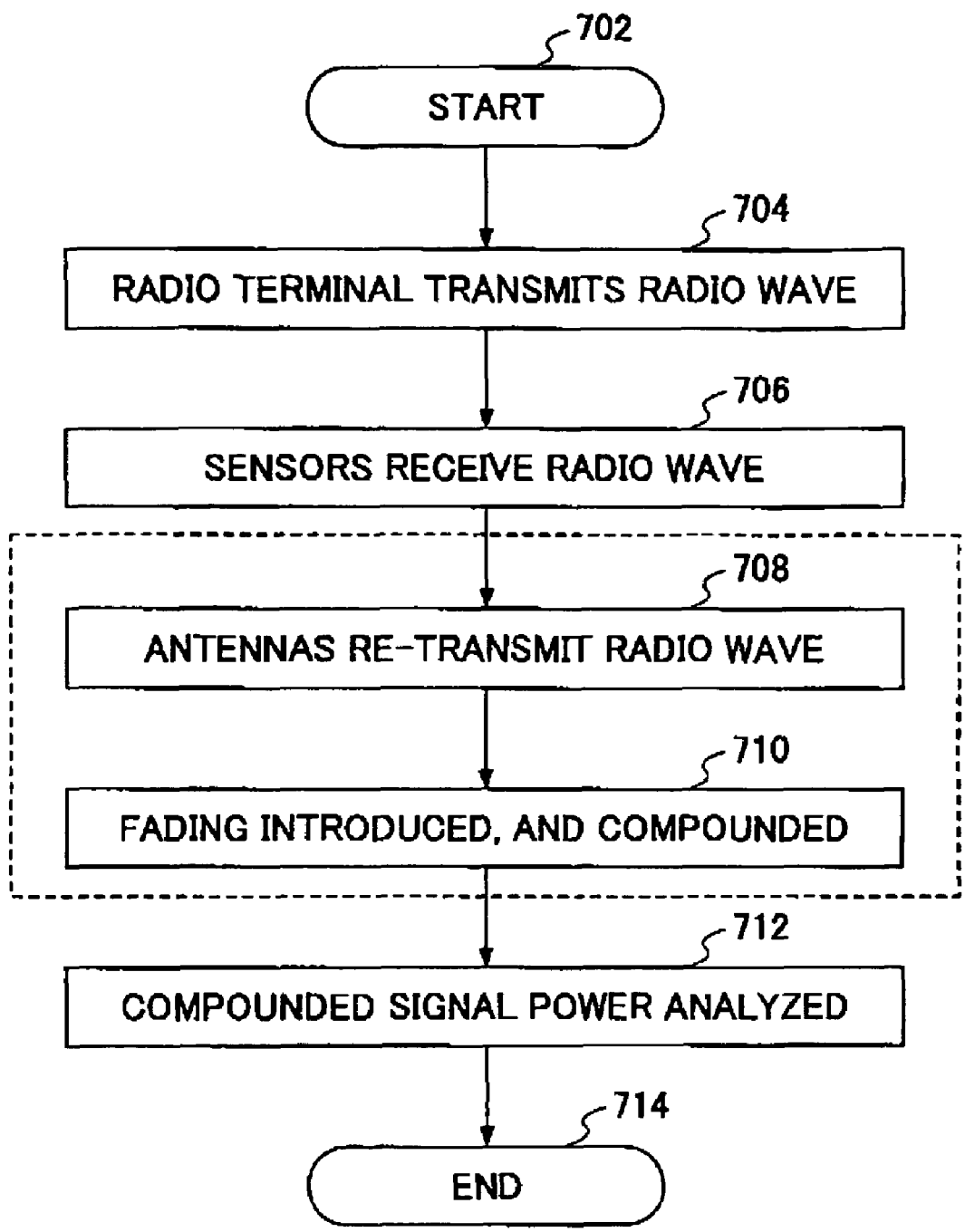

FIG.8

| | EMBODIMENT | PATTERN INTEGRATION METHOD | RANDOM FIELD METHOD |
|---|---|---|---|
| SENSOR ARRANGEMENT | FIXED, OVER ALL SOLID ANGLES | RADIO TERMINAL ROTATED, SENSORS SCAN | FIXED |
| SENSOR QUANTITY | GREAT (ORTHOGONAL POLARIZATION DETECTABLE) | ONE (POLARIZATION SWITCHED) | ONE |
| RECEIVING WAVE | PLANE WAVE | PLANE WAVE | RANDOM SCATTERED WAVE |
| ROTATION/ SCANNING | NOT REQUIRED | REQUIRED FOR EACH POLARIZATION | REQUIRED |
| MEASUREMENT TIME | SHORT | LONG | RELATIVELY SHORT |
| ANECHOIC CHAMBER | REQUIRED | REQUIRED | NOT REQUIRED |
| MEASUREMENT INCLUDING HUMAN BODY | EASY | NOT EASY | EASY |

WEIGHT DETERMINING APPARATUS, A WEIGHT DETERMINATION METHOD, A RADIATION POWER MEASURING APPARATUS, AND A RADIATION POWER MEASURING METHOD

BACKGROUND OF THE INVENTION

1. Field of the Invention

The present invention generally relates to mobile communications, and especially relates to an apparatus and a method of determining weights of two or more transmitting antenna elements of a mobile terminal. Further, the present invention also relates to an apparatus and a method of measuring transmission power transmitted by a radio terminal.

2. Description of the Related Art

When designing mobile terminals, a representative example being portable telephones, one important concern is to raise transmission efficiency, given that a part of the transmission power is lost to (attenuated by) objects such as a human body in the neighborhood of the mobile terminal, and the transmission efficiency is degraded. Any objects, not limited to the human body, that intercept radio wave propagation can cause degradation of transmission efficiency.

It is generally known that the transmission efficiency can be improved by feeding power simultaneously to two or more antenna elements, wherein amplitude and a phase are appropriately adjusted such that antenna directivity is obtained. Differences in the amplitude and the phase between the antenna elements are referred to as "weight", "feeding weight", and the like. Technologies in this regard are disclosed by Non-patent References 1 and 2, for example.

According to the conventional weight determination method, initial weight (a relative gain and phase difference) is first given to two or more antenna elements of a portable telephone. Next, a radio wave is transmitted using all the antenna elements and the radiant efficiency is calculated and/or measured. Furthermore, values of the weights given to the antenna elements are changed, a radio wave is transmitted by all the antenna elements, and radiant efficiency is calculated and/or measured. Subsequently, radiant efficiency is obtained for all the weights (i.e., all combinations of gains and phase differences). Then, a weight that gives the best radiant efficiency is made the weight of the transmitting antenna element of the mobile terminal.

Further, a radiation-pattern integration method is known as another technique of measuring radiant efficiency, and measuring radiation power that serves as the base of the radiant efficiency. The radiation-pattern integration method obtains an antenna radiation pattern by a fixed sensor measuring the power from the radio terminal, wherein the power is measured and integrated over the whole region (all solid angles, including all vertical and horizontal angles) that surrounds the radio terminal, while relative positions between the radio terminal (such as a mobile terminal) and the sensor are changed. The sensor may receive horizontal and vertical polarization components simultaneously with two polarization antennas that intersect orthogonally, or alternatively, may switch the arrangement directions of one polarization antenna such that each component is separately received. The radiation-pattern integration method is disclosed by Non-patent References 3 and 4, for example. Another method called random field method is also practiced, which is a power measuring method that uses a great number of objects (scattering objects) that are appropriately arranged in a room where measurement is performed such that a radio wave transmitted by the radio terminal is scattered, and the radiant efficiency is obtained from statistics of the received waves that are scattered by the scattering objects.

[Non-patent Reference 1] Tomoaki Nishikido, et al., "Two parallel element distributed feeding antenna element for portable radio terminals", Shin-gaku Society Convention B-1-190, 2003

[Non-patent Reference 2] Ryo Yamaguchi, et al., "Improvement in efficiency of the cellular phone by distributed feeding", Shin-gaku Society convention B-4-4, 2003

[Non-patent Reference 3] Sakuma, et al., "A study of radiant efficiency measurement of a small antenna", Electricity-related Academic Conference Hokkaido Branch Union Convention, Fiscal year Heisei 12, p. 202

[Non-patent Reference 4] Qiang CHEN, et al., "Measurement of Power Absorption by Human Model in the Vicinity of Antennas", IEICE TRANS. COMMUN. VOL. E80-B, NO. 5, MAY 1997, pp. 709-711

DESCRIPTION OF THE INVENTION

Problem(s) to be Solved by the Invention

According to the conventional practices as described above, in order to determine weight, it is necessary to sequentially change the phase and amplitude so that all possible weights may be covered by calculation and/or measurement, which is not efficient. Further, the amount of effort required for calculation, measurement, etc., is not small. Generally, it is advantageous to increase the number of antenna elements for raising directivity of an antenna. However, if the number of antenna elements is increased, the burden of calculation to determine the weight notably increases, and the weight cannot be promptly obtained. For example, suppose that 10 amplitude ratios between two antenna elements are considered, namely, from 0.1 to 1.0 in increments of 0.1; and 360 phase differences from 0° to 359° are considered in increments of 1°. In this case, the number of possible weights in the case of two elements is 10×360=3600 possibilities. If three elements are to be considered, the total number of the possible weights becomes 3600×3600. Generally, in the case of N elements, the total number of possibilities becomes $3600^{N-1}$. A huge number of combinations have to be examined, the number increasing depending on the (N−1)th power. Although the concern about the calculating burden is gradually mitigated by improvements in the speed and capacity of computers in recent years and continuing, the burden in development of a simple small mobile terminal is still great.

Further, as for the power measuring method, since it is necessary to calculate the measured power values of all solid angles, the radio terminal has to be rotated in the directions of θ and/or φ a vast number of times, so that the measurement takes a long time according to the radiation-pattern integration method disclosed by Non-patent Reference 3. When determining the influence of the surrounding environment (for example, a human body) on the radio terminal, not only the radio terminal but objects in the surrounding environment have to be simultaneously rotated, which requires a large-scale apparatus; thus, measurements are not easy to obtain. About this point, as shown in Non-patent Reference 4, the apparatus can be simplified by making both sensor and radio terminal movable, e.g. the sensor is made movable in an elevation angle direction, and the radio terminal is made movable in an azimuth angle direction. Nevertheless, the number of measurement points remains the same, and the time required of the measurement remains the same. It is conceivable that two or more sensors are arranged along a certain meridian, and that each sensor is connected to an analyzing unit (for example, a spectrum analyzer) by switching. Even in this case, measurements have to be carried out with the radio terminal rotating, which still requires a long time. Further, there are cases wherein the objects in the surrounding environment are not suited for rotating at high speed. As for the random field method, it does not require an anechoic chamber, and the radiant efficiency can be measured at comparatively high speed; however, there is a problem in that the evaluation and adjustment of the measurement environment, including an installation point of the scattering objects, etc., are not easy.

SUMMARY OF THE INVENTION

The present invention aims at coping with at least one of the problems as described above, and the first object is to offer a weight determining apparatus and a weight determination method of efficiently determining the weight of each antenna element of the mobile terminal that performs radio transmission using two or more antenna elements, the weight determining apparatus and the weight determination method substantially obviating one or more of the problems caused by the limitations and disadvantages of the related art.

The second object of the present invention is to offer a radiation power measuring apparatus and a radiation power measuring method of measuring the radiation power of the radio terminal at high speed, the radiation power measuring apparatus and the radiation power measuring method substantially obviating one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by the weight determining apparatus, the weight determination method, the radiation power measuring apparatus, and the radiation power measuring method particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

Means for Solving the Problem

The weight determining apparatus according to the present invention includes:

two or more antenna elements of a mobile terminal for receiving one or more test waves transmitted by one or more test wave sources prepared outside of a phantom that simulates an object that causes the test waves to be degraded; and weight determination means configured to determine the weight of each antenna element so that a signal received as a whole may be the strongest.

Further, a radiation power measuring apparatus according to the present invention includes:

a radio terminal that transmits a radio wave;

two or more sensors that are arranged at a distance from the radio terminal, and receive the radio wave;

compounding means for compounding signals received by the sensors, the signal being transmitted by the radio terminal; and analysis means for analyzing the power of the signal compounded by the compounding means; wherein the signals input to the compounding means are separately and wirelessly transmitted, and spatially compounded.

Effect of the Invention

According to the present invention, the weight of each antenna element of a mobile terminal performing radio transmission using two or more antenna elements can be efficiently determined. Further, according to the present invention, the radiation power of the radio terminal can be measured at high speed.

BRIEF DESCRIPTION OF THE DRAWINGS

FIG. 7 is a flowchart showing an operation of the radiation power measuring system shown in FIG. 6;

FIG. 8 is a table wherein techniques according to the embodiment of the present invention and the conventional method are compared from various viewpoints;

DESCRIPTION OF THE PREFERRED EMBODIMENTS

Figure 1:
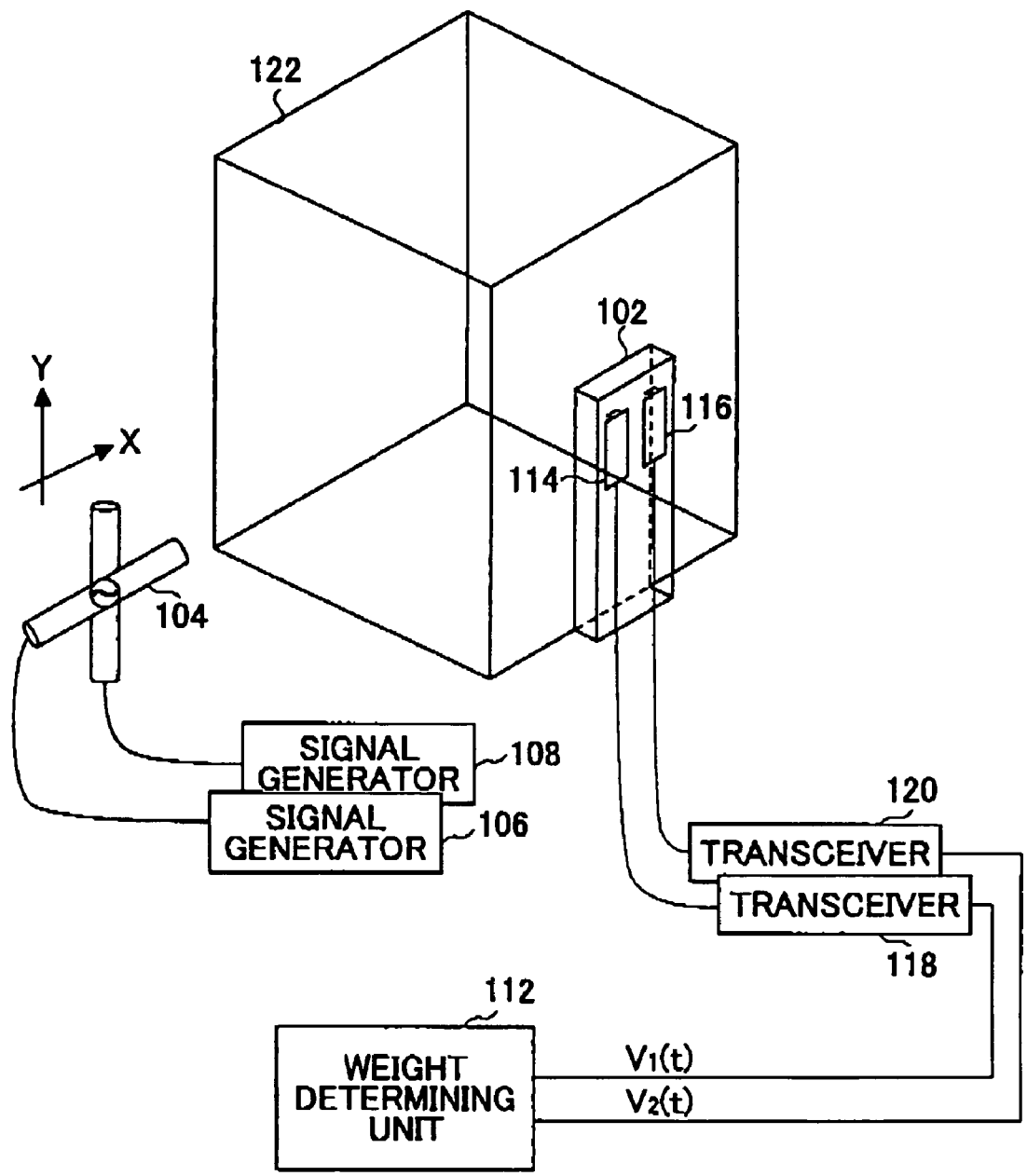
FIG. 1 is a perspective/block diagram showing the concept of a weight determining system according to an embodiment of the present invention.

In the following, embodiments of the present invention are described with reference to the accompanying drawings.

According to an aspect of the present invention, one or more test wave sources are prepared outside of a phantom that simulates an object that attenuates a radio wave, and transmit test waves that are received by two or more antenna elements of a mobile terminal. A weight of each antenna element is determined so that the signal received as a whole may become the strongest (maximized). The weights that maximize the total received power realize the antenna pattern that minimizes loss (attenuation) of the radio wave, maximizes the transmission efficiency, and minimizes the radio wave absorbed by the phantom as a result.

According to an aspect of the present invention, the signal received by the antenna elements is a signal transmitted by one unfixed (movable) test wave source prepared outside of the phantom. By making the test wave source movable, the number of test wave sources can be reduced.

According to an aspect of the present invention, the signal received by the antenna elements is a signal transmitted by two or more fixed test wave sources prepared outside of the phantom. In this manner, the weight can be promptly determined.

According to an aspect of the present invention, the test wave source is capable of transmitting a radio wave in any polarization. Further, although the polarization is in one certain direction at a given instant, when a time average is taken, the polarization is isotropic, and the test wave source is a random wave source. In this manner, the weight in consideration of polarization can be determined not only in one specific direction, but also in all the directions.

According to an aspect of the present invention, the radio wave transmitted by the radio terminal is received by two or more sensors arranged at a distance from the radio terminal, signals received by the sensors are separately transmitted and spatially compounded, and the power of the signal after compounding is analyzed. Since the power of the signal spatially compounded is analyzed, although the field radiation pattern may be unknown, the total power transmitted by the radio terminal is promptly measured.

According to an aspect of the present invention, two or more signals input to the compounding means are separately and wirelessly transmitted, and spatially compounded with a disturbance representing fading. In this manner, the weights when compounding outputs from the sensors can be randomly changed, and by averaging measured instant power values after compounding, measurement precision can be raised.

According to an aspect of the present invention, the sensors are arranged in an area belonging to a part of solid angles, centering on the radio terminal. For example, by arranging the sensors only in an upper hemisphere area (i.e., the contribution by the ground is omitted), the number of the sensors can be decreased, thereby attaining a higher efficiency of the measurement.

According to an aspect of the present invention, the sensors are arranged over all the solid angles, centering on the radio terminal. In this case, a highly precise measurement can be obtained.

According to an aspect of the present invention, the sensors output a signal that represents the vertically polarized component and a signal that represents the horizontally polarized component of a radio wave. In this manner, a desired polarization component can be taken into consideration.

According to an aspect of the present invention, two or more samples (instantaneous values) representing an output signal from the compounding means are averaged, and the averaged signal is analyzed by the analysis means. In this manner, precision of the power measurement is improved.

According to an aspect of the present invention, instead of or in addition to the compounding means, distribution means connected to two or more wave sources, and analyzing means to analyze the power of the signal received at the radio terminal are provided. The signal input into the distribution means is wirelessly transmitted, and is spatially distributed to two or more wave sources (i.e., an inverse process to the spatial compounding described above). The wave sources transmit a radio signal according to the signal received from the distribution means. In this manner, the transmitting side and the receiving side can be reversed as compared with the above-mentioned aspect.

Embodiment 1

Figure 2:
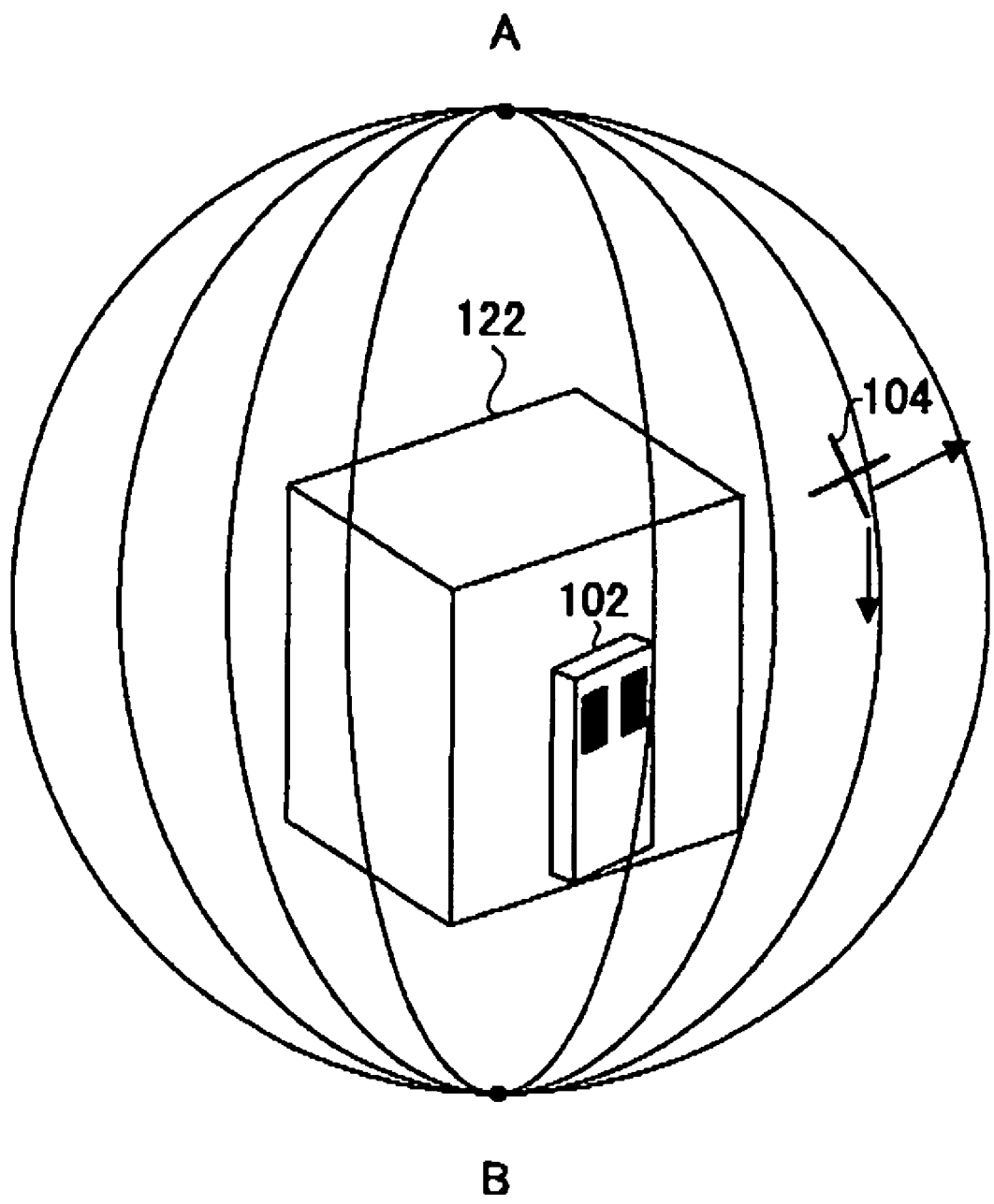
FIG. 2 is a perspective diagram showing how an antenna element for a test wave is scanned along with a spherical surface.

FIG. 1 shows the conceptual structure of the weight determining system (the system) according to Embodiment 1 of the present invention, which includes a portable telephone 102, an antenna element 104 for test waves, signal generators 106 and 108, and a weight determining unit 112. The portable telephone 102 includes two or more antenna elements 114 and 116 that are connected to transmitter-receivers (transceivers) 118 and 120, respectively. The system further includes a phantom 122 that is a simulated human body, and arranged close to the portable telephone 102. The antenna element 104 for test waves is arranged outside of the phantom 122 such that the antenna element 104 for test waves can move on the surface of a sphere that surrounds the phantom 122 as shown in FIG. 2.

Figure 5:
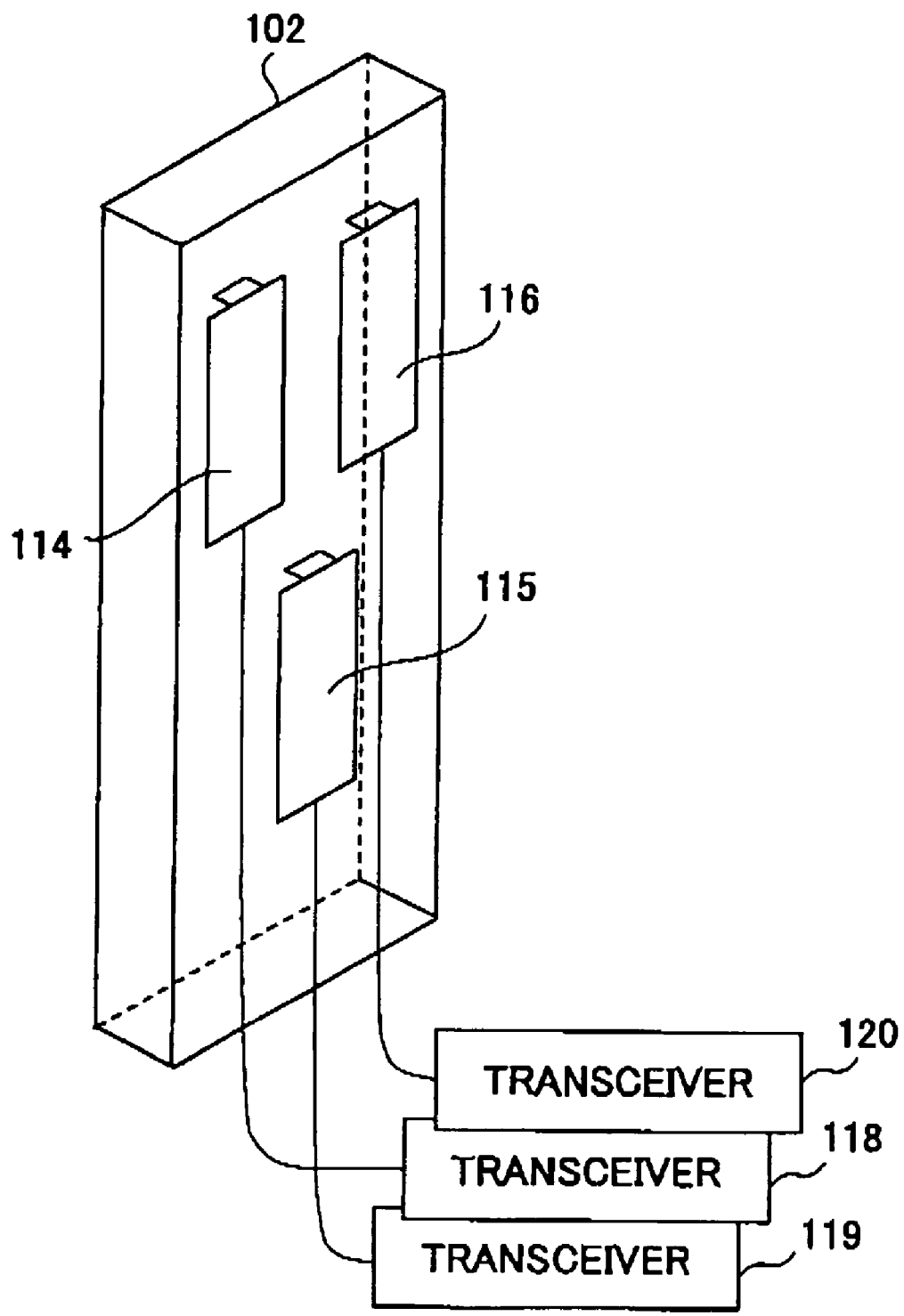
FIG. 5 is a perspective/block diagram showing a portable telephone that has three antenna elements.

The system determines the weight of each of the antenna elements 114 and 116 of the portable telephone 102 shown in FIG. 1. For simplicity of the description, Embodiment 1 describes an example wherein two antenna elements are installed. Nevertheless, the number of antenna elements is not limited to two, but more than two antenna elements can be provided as required, for example, as shown in FIG. 5. In the example shown in FIG. 5, three antenna elements 114, 115, and 116 are provided, to which three transceivers 118, 119, and 120, respectively, are connected.

The antenna element 104 for test waves shown in FIG. 1 is capable of transmitting a radio wave that is polarized in any desired direction, and is a two-axis dipole antenna element according to Embodiment 1. The antenna element includes two dipole antenna elements that are capable of transmitting a radio wave in any desired polarization, and that are orthogonally arranged, i.e., one perpendicular to the other.

The signal generators 106 and 108 are connected to corresponding axes of the antenna element 104 for test waves, and drive the antenna element 104 in each axial direction. The signal generators 106 and 108 and the antenna element 104 for test waves constitute a test wave source. The test wave source according to Embodiment 1 is a random wave source, wherein the polarization at a given instant is in a certain direction; however, if a time average is taken, the test wave is isotropically transmitted. The test wave transmitted at a given instant is equivalent to a radio wave that is polarized in a direction of a certain elevation angle $\theta$ and a certain azimuth $\phi$. However, the direction of polarization is randomly changed from moment to moment; the direction of polarization, as a result, becomes distributed, and isotropic. According to Embodiment 1, a test wave source that randomly changes the direction of polarization every moment is used. In other words, the antenna element 104 for test waves has two degrees of freedom concerning the direction of polarization, and is capable of generating a radio wave, the direction of polarization of which is changed from moment to moment.

The antenna elements 114 and 116 of the portable telephone 102 receive a signal of the test wave transmitted by the antenna element 104 or test waves. The signal received by each antenna element is provided to the weight determining unit 112 through a reception process at each of the transceivers 118 and 120.

The weight determining unit 112 determines a weight (a relative gain and phase difference) of each of the antenna elements 114 and 116 based on the signal received through each of the antenna elements 114 and 116, respectively.

The phantom 122, being a human body simulator, is an object (attenuating medium) that attenuates a radio wave such as the head of a human body. For simplicity, the phantom 122 according to Embodiment 1 is shaped as a cube having each side measuring about 20 cm; nevertheless, any other desired shape can be used. Here, the specific-inductive-capacity $\epsilon_r$ of the phantom is set at 41, and the conductivity $\sigma$ is set at 1.3 S/m, for example. The phantom specifies a direction in which the radio wave should not be directed (inhibit direction) when the portable telephone carries out a radio transmission. The main purpose of setting up the inhibit direction is to reduce the power loss through the technique descried below. Not only that, but also the technique reduces influence of the radio wave to an electronic apparatus that should not be electro-magnetically interfered with.

Figure 3:
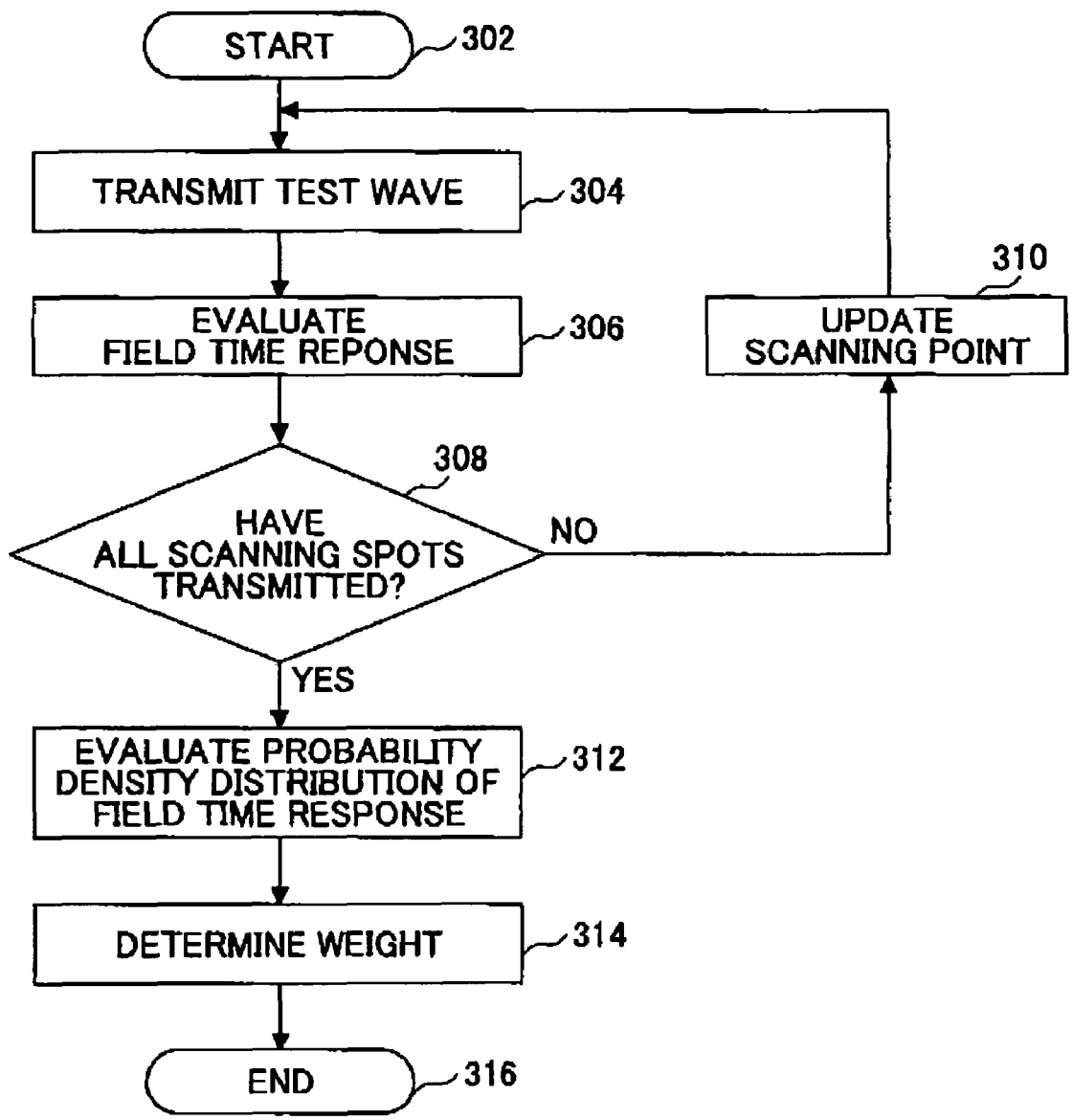
FIG. 3 is a flowchart showing a weight determination method according to the embodiment of the present invention.

FIG. 3 shows the flowchart for determining the weight of the antenna element according to Embodiment 1 of the present invention. The flow begins with Step 302 and progresses to Step 304.

At Step 304, a test wave is transmitted from a place (initial position) outside of the phantom 122. The initial position may be one of a point A, a point B, and any other points on the spherical surface shown in FIG. 2. The test wave, the polarization of which changes from time to time, is transmitted by the antenna element 104 for test waves. The signal of the test wave is received by each of the antenna elements 114 and 116 of the portable telephone 102. The received signal is provided to the weight determining unit 112 through the reception process at the transceivers 118 and 120 as a received signal of each antenna element, i.e., electric-field time-responses of each antenna element, $V^{(1)}(t)$, and $V^{(2)}(t)$.

At Step 306, the electric-field time-responses $V^{(1)}(t)$ and $V^{(2)}(t)$ of each antenna element are estimated (obtained). These may be obtained by experiment, or alternatively, can also be computed using a relational expression of the following formulae.

$$V^{(1)}(t)=E_{1x} \times n_x(t)+E_{1y} \times n_y(t)+E_{1z} \times n_z(t)$$

$$V^{(2)}(t)=E_{2x} \times n_x(t)+E_{2y} \times n_y(t)+E_{2z} \times n_z(t)$$

Here, $n_x(t)$, $n_y(t)$, and $n_z(t)$ are coordinate components of a bandwidth-limited white-noise vector n(t); $E_{1x}$, $E_{1y}$, and $E_{1z}$ are components of the electric-field response of the antenna element 114 (the first antenna element), and $E_{2x}$, $E_{2y}$, and $E_{2z}$ are components of the electric-field response of the antenna element 116 (the second antenna element). If values of these items are known, the electric-field time response can be calculated without the need to experiment. The electric-field response and the components ($E_{1x}$, and so on) are constants, i.e., are not dependent on time. Accordingly, it is often referred to as "a stationary electric-field response".

At Step 308, it is determined whether the test wave has been transmitted from all the points (scanning points) on the spherical surface that surrounds the phantom. If the determination is negative, the process progresses to Step 310.

At Step 310, he scanning point is moved (updated) to the next place, the process returns to Step 304, and the test wave is transmitted from the next (updated) scanning point. Henceforth, the same process is repeated. If it is determined that the test wave has been transmitted from all the scanning points at Step 308, the process progresses to Step 312.

At Step 312, the probability density distribution of the electric-field time responses obtained at Step 306 is evaluated. The probability density distribution about the relative gain and the phase difference of a radio wave received by each antenna element over a certain period is obtained based on the electric-field time responses of each antenna element.

At Step 314, the gain and the phase difference (namely, the weight), at which the radio wave received by each antenna element becomes the strongest (maximized) as a whole, are obtained, for example, by a maximum ratio synthesizing method, while evaluating the probability density distribution.

For example, this process is as follows. A covariance matrix R is first computed based on the electric-field time-responses $V^{(1)}(t)$, and $V^{(2)}(t)$. A matrix element $R_{ij}$ of a covariance matrix R is defined as a sum of products of $V^{(i)}(t)$, and a complex conjugate of $V^{(j)}(t)$ over a certain period.

$$R_{ij}=\Sigma V^{(i)}(t) \times V^{(j)}(t)^*$$

Here, "*" denotes a complex conjugate. The weight, with which the received power becomes the strongest, is computed using the covariance matrix described above. In other words, the weight that maximizes the total received power of the test wave is obtained by carrying out an adaptation algorithm including the process described above.

With the weight having been computed, the process progresses to and ends at Step 316.

Thus, according to Embodiment 1, the weights of the antenna elements 114 and 116 of the portable telephone 102 are set up so that the total received power (the sum of the received power from all the scanning points) of the test wave transmitted by the antenna element 104 for test waves from the outside of the phantom 122 may be maximized. Under this situation, when the portable telephone 102 transmits, feeding power to the antenna elements 114 and 116 using the weights, the transmission efficiency of the portable telephone 102 becomes the greatest for the following reasons. That the total received power at the portable telephone 102 of the test waves from the antenna element 104 from all the scanning points is maximized means that the radio wave is received with the least loss. By the reversibility of transmission and reception, when a radio wave is transmitted by a cellular phone on the same frequency by the same weight, loss of a radio wave is minimized, and transmission efficiency is maximized. Consequently, the weights determined in this way reduce transmission of the radio wave in the inhibit direction (if the transmission is directed to the inhibit direction, loss of the radio wave becomes great, and the transmission efficiency is not maximized).

According to Embodiment 1, Steps 304 through 310 are repeated, an electric-field time response is computed by sequentially changing the place of the test wave source so that all the scanning points may be covered, and the weights are determined (Step 314) by evaluating the probability density distribution (Step 312). Further, since the number of the scanning points is independent of the number of antenna elements, it is possible to efficiently determine the weights with an operational burden less than the conventional technique (according to the conventional technique, the operational burden rapidly increases depending on the number of antenna elements).

According to Embodiment 1, the test wave source is a random wave source. Suppose that the test wave source is a non-random wave source, i.e., the test wave source transmits a radio wave that is always polarized in a fixed direction. In this case, a radio wave that is polarized only in one specific direction is received by each of the antenna elements 114 and 116, and the weights that maximize the total received power about all the scanning points on the spherical surface are obtained at YES to Step 308 of FIG. 3. The weights obtained in this manner maximize the radio wave only at the polarization in the specific direction. However, the weights do not maximize the radio wave in other polarization directions. Therefore, the weights do not provide the maximum total received power of the radio wave, and the transmission efficiency is not maximized. It is necessary to use a random wave source in order to obtain the weights that maximize the total received power of the test wave, and to maximize the transmission efficiency.

Although the dipole antenna element is used as the antenna element for test waves according to Embodiment 1, other types of antenna elements may be used so long as they function as a random wave source. For example, a loop antenna element may be used, which is advantageous from viewpoints of ease of impedance matching and ease of manufacturing. The dipole antenna element is advantageous from a viewpoint of ease of analysis based on the electric-field level. Further, from a viewpoint of further randomizing the directions of polarization, an antenna element having three axes, namely, x, y, and z is advantageous (rather than the two axes, x and Embodiment 2

Figure 4:
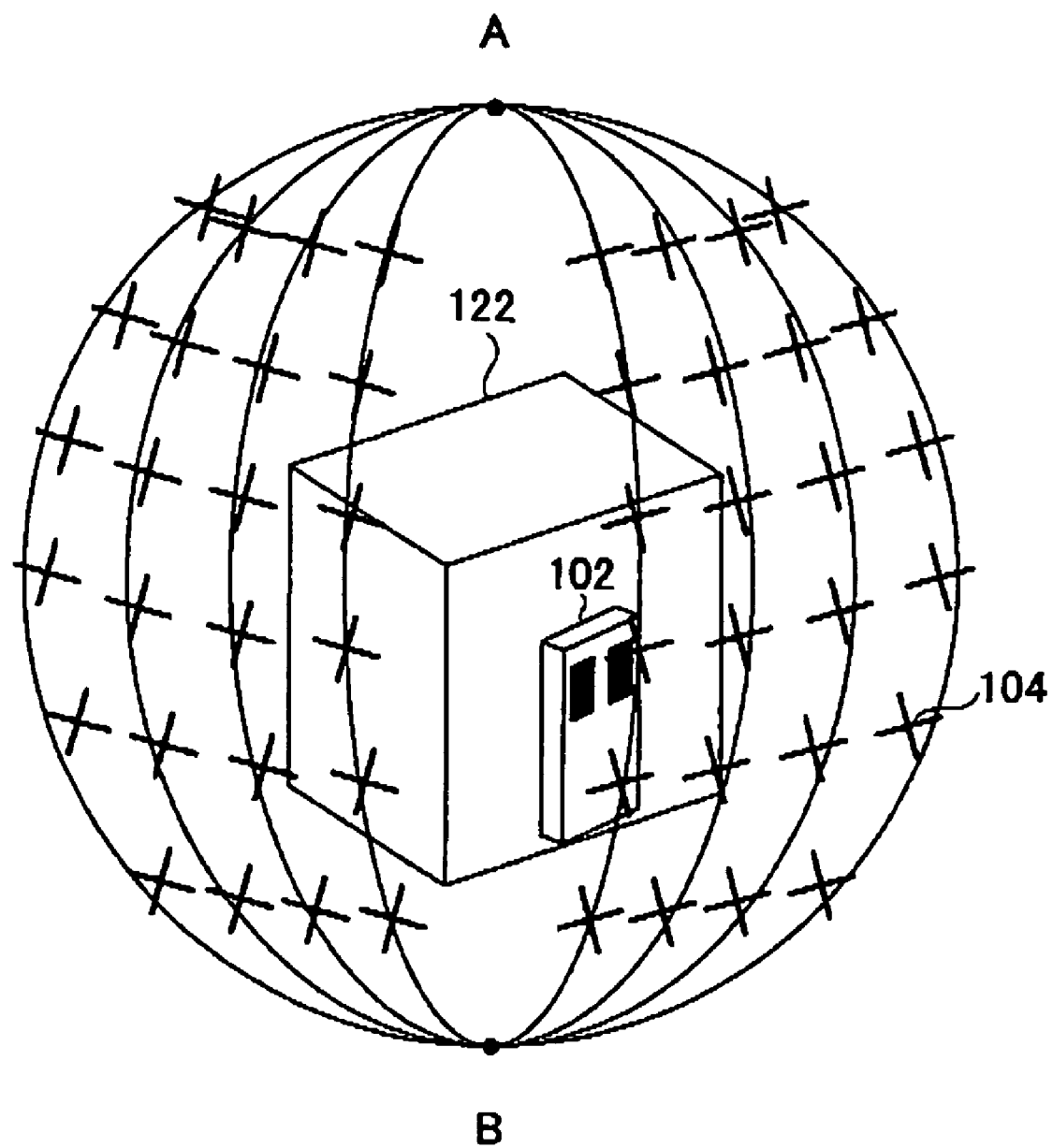
FIG. 4 is a perspective diagram showing a situation wherein a number of antenna elements for test waves are used.

FIG. 4 shows the conceptual structure of the weight determining system according to Embodiment 2 of the present invention. In Embodiment 2, a great number of antenna elements 104 for test waves are formed, being fixed on the spherical surface that surrounds the phantom 122. Signal generators as shown in FIG. 1 are provided to the antenna elements 104 for test waves. The antenna elements 104 for test waves and the respective signal generators constitute the random wave source. In Embodiment 2, the test wave is simultaneously transmitted by the antenna elements 104 for test waves, rather than one antenna element for test waves transmitting the test wave while moving along with the spherical surface. The weights are determined so that the power of the signal received by each antenna element of the portable telephone 102 may be maximized. According to Embodiment 2, the weights can be promptly determined based on the power of the signal simultaneously received, rather than one antenna element for test waves scanning in a predetermined area (for example, the area on the spherical surface). Embodiment 1 is desirable if the number of antenna elements is desired to be small. Embodiment 2 is desirable if prompt determination of the weights is preferred. Further, combining Embodiment 1 and Embodiment 2 is possible, wherein some antenna elements for test waves are fixed, and others are not fixed.

Embodiment 3

Figure 6:
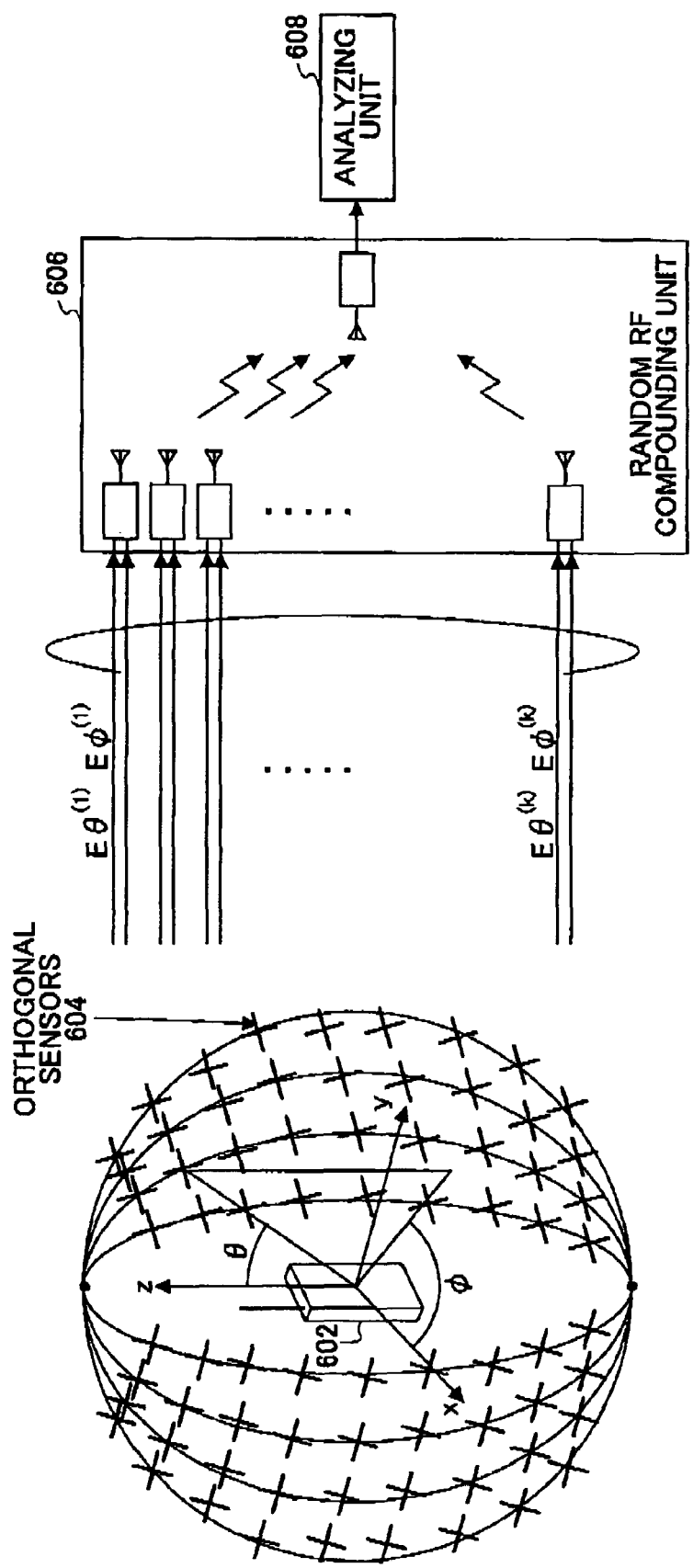
FIG. 6 is a perspective/block diagram showing the concept of a radiation power measuring system according to the embodiment of the present invention.

FIG. 6 shows a radiation power measuring system according to Embodiment 3 of the present invention. In this Embodiment, the power of the signal transmitted by the radio terminal is promptly measured. The radiation power measuring system includes a radio terminal 602 such as a mobile terminal, a number of orthogonal sensors 604, a random RF compounding unit 606, and an analyzing unit 608.

The radio terminal 602 may be any apparatus that transmits a radio wave serving as the measuring object. Therefore, the radio terminal 602 may be a mobile terminal, and a non-movable computer that has a radio-communications function. A signal carried by the radio wave transmitted can be any signal, and is not limited to any specific contents or specific signal format.

The orthogonal sensors 604 are formed on the spherical surface that surrounds the radio terminal 602, namely, they are formed at the same distance from the central point of the radio terminal 602. In practice, the orthogonal sensors 604 may be provided to each face of a polyhedron such as a regular icosahedron made from a metal plate, the regular icosahedron surrounding the radio terminal 602. Further, the polyhedron may be formed in the shape of a mesh with an insulator such as plastics and ceramics. The orthogonal sensors 604 are capable of receiving and detecting the radio wave transmitted by the radio terminal 602. The orthogonal sensors 604 can distinguish and detect the electric-field-vector components, namely, a horizontally polarized wave (E$\phi$) and a vertically polarized wave (E$\theta$). The elevation angle direction is expressed by $\theta$, and the azimuth direction is expressed by $\phi$ as shown in FIG. 6. In the example shown in FIG. 6, the number of the orthogonal sensors 604 is set at K, and 2K signals, namely, (E$\theta^{(1)}$, E$\phi^{(1)}$, . . . , E$\theta^{(K)}$, E$\phi^{(K)}$, are output.

Here, according to the present Embodiment, the orthogonal sensors 604 are uniformly arranged over the whole region (all solid angles) that surrounds the radio terminal 602. Nevertheless, the orthogonal sensors 604 may be arranged such that only certain solid angles may be covered. For example, the orthogonal sensors 604 may be arranged in a region defined by $-90°<=\theta<=90°$, and $0°<=\phi<=360°$, which omits below the ground from consideration. Alternatively, the orthogonal sensors 604 may be arranged in a region defined by $0°<=\phi<=45°$, and power is measured while the radio terminal 602 is rotationally moved 8 times ($360°/45°=8$), the amount of the rotational movement being 45° each time. In this way, the number of the orthogonal sensors 604 can be reduced. That is, if the orthogonal sensors 604 are arranged in the whole region, since it is not necessary to rotate the radio terminal 602, data from all points of measurement can be collected at once, and power measurement can be performed at high speed. If the number of the orthogonal sensors 604 is desired to be small, measurement can be carried out by rotationally moving the radio terminal 602.

Signals, 2K in number, output by the orthogonal sensors 604 are provided to the random RF compounding unit 606. The random RF compounding unit 606 re-transmits the input signals, 2K in number, separately as K radio signals from K antennas. For example, the first antenna transmits a radio signal expressed by (E$\theta^{(1)}$, E$\phi^{(1)}$). Similarly, the k-th antenna transmits the radio signal expressed by (E$\theta^{(K)}$, E$\phi^{(K)}$). These radio signals are received by one antenna, i.e., the radio signals are spatially compounded.

According to the present Embodiment 3, a synthetic weight that randomly changes is used when the radio signals are spatially compounded. From the viewpoint of accurately measuring the power transmitted by the radio terminal, it is desirable to use the conventional pattern integration, wherein power is measured at a certain coordinate point ($\theta$, $\phi$), the measurement point is moved, measured values are integrated, and a power distribution is obtained. (However, as mentioned above, this technique requires a long time for measurement.) According to the present Embodiment 3, each power value (as a result, power distribution) of each coordinate point ($\theta$, $\phi$) is not obtained, but the power of the signal transmitted by the radio terminal is approximated by the power of the signal after spatial compounding (after vector compounding). Accuracy of the approximation can be degraded due to a position error, a phase shift, etc., of the orthogonal sensors and the antenna if the synthetic weight used at the spatial compound is a fixed value. Accordingly, a synthetic weight that randomly changes is used, a large number of signal samples representing the signal after spatial compounding are averaged, and the accuracy of the approximation and the precision of the measurements are enhanced.

According to the present Embodiment 3, in order to change the synthetic weight at random, fading is introduced into the radio communications between the antenna for retransmission and the antenna for compounding. Introduction of fading is performed, for example, by randomly disturbing the electromagnetic field near two or more antennas for the retransmission of the random RF compounding unit 606. For example, two or more antennas for retransmission are arranged near a disk on which metal pieces are sprinkled, and a radio wave is transmitted by each antenna while rotating the disk. The transmitted radio waves are scattered by the metal pieces, i.e., are disturbed at random, and they reach the antenna for compounding. In this manner, the signals retransmitted from each antenna, each receiving individual fading, are compounded.

When carrying out a simulation of the random RF compounding unit 606, the synthetic power can be determined by performing signal processing as shown in the following formulas, for example.

[Equation 1]

$$E(t) = \sum_k E^{(k)}(t) \quad (1)$$

$$= \begin{bmatrix} E_\theta^{(1)} & E_\phi^{(1)} & \ldots & E_\theta^{(k)} & E_\phi^{(k)} \end{bmatrix} \begin{bmatrix} N_\theta^{(1)}(t) \\ N_\phi^{(2)}(t) \\ \vdots \\ N_\theta^{(k)}(t) \\ N_\phi^{(k)}(t) \end{bmatrix} \quad (2)$$

$$P_{ave} = \text{average}\{|E(t)|^2\} \quad (3)$$

$$P_{ave} = P_{AUT}/P_{dipole} \quad (4)$$

Here, $E\theta^{(k)}$ and $E\phi^{(k)}$ are the electric-field-vector components (stationary electric-field responses) obtained by the k-th sensor, and are constant values independent of time. $N\theta^{(k)}(t)$ and $N\phi^{(k)}(t)$ are a θ component and a φ component, respectively, of a white-noise signal to which a band limit is carried out, and are time-dependent functions that express the RF composition weight to the k-th sensor. Therefore, a synthetic signal E(t) that is output by the RF compounding unit 606 is a time-dependent function. Thus, according to the simulation, the electric-field-vector components $E\theta^{(k)}$ and $E\phi^{(k)}$, and the noise components $N\theta^{(k)}$ and $N\phi^{(k)}$ that are independent of time are individually separated. In an actual apparatus, however, a multiplying operation as shown by Formula (2) above is not performed, but the synthetic signal E(t) is actually measured.

Here, in order to determine the electric-field-vector components $E\theta^{(k)}$, $E\phi^{(k)}$, power, etc., of the signal received by each sensor, an apparatus such as the analyzing unit 608 is connected to the sensor. It is theoretically possible to determine the power distribution (radiation pattern) in addition to the power at the point of each sensor if each sensor is provided with an analyzing unit. However, it is not realistic to provide that many analyzing units. If one analyzing unit is to cover a number of sensors by switching, a long time is required for collecting and analyzing all of K values. According to the present Embodiment 3, a power value and a power distribution at each coordinate point (θ, φ) are not obtained, but the power of the signal transmitted by the radio terminal is approximated by the power of the signal after spatial compounding. By averaging such instantaneous power values that are measured, the accuracy of the approximation and precision of the measurements are enhanced.

In addition, the technique to randomize the synthetic weight is not limited to introducing the fading as described above. For example, a varactor diode may be used at the output section of each sensor, and may adjust the directivity of the sensor.

The analyzing unit 608 is capable of carrying out power measurement and other processes based on the signal output from the random RF compounding unit 606. The analyzing unit 608 can be served by, e.g., an oscilloscope, a spectrum analyzer, a network analyzer, and a field strength measuring instrument. In the simulation, the mean power $P_{ave}$ as shown in Formula (3) is computed based on the synthetic signal E(t) computed according to Formula (2). Then, the radiant efficiency η as shown in Formula (4) is computed based on the measured power. Here, $P_{AUT}$ representing the measured power, and $P_{dipole}$ being power that is obtained by the analyzing unit 608 when the radio terminal 602 transmits a radio wave from a dipole antenna, become the criteria of radiant efficiency calculation. For example, the power of the signal transmitted by the dipole antenna is measured without providing a phantom, and the value is set to $P_{dipole}$. Then, the power of the signal transmitted where the phantom is prepared is set to $P_{AUT}$. The transmission efficiency $\eta = P_{AUT}/P_{dipole}$ computed in this manner represents the change of the transmission efficiency resulting from the phantom.

FIG. 7 is a flowchart for explaining an operation of the radiation power measuring system shown in FIG. 6. The process starts with Step 702 and progresses to Step 704.

At Step 704, the radio terminal 602 transmits a radio wave.

At Step 706, the radio wave transmitted by the radio terminal 602 is received by the orthogonal sensors 604. Each orthogonal sensor provides a received electric field vector ($E\theta^{(n)}$, $E\phi^{(n)}$) to the random RF compounding unit 606.

At Step 708, 2K signal components of the received electric field vectors are re-transmitted from K antennas.

At Step 710, disturbance representing fading is introduced so that the signals transmitted by K antennas may be spatially compounded with the randomized weight by one antenna. Although Step 708 and Step 710 are separately explained, it is for convenience; and in fact, they are not performed separately in steps, but at least a part of Step 708 and a part of Step 710 are simultaneously performed.

The power of the signal after being spatially compounded is measured and analyzed at Step 712. Then, the process progresses to and ends with Step 714.

FIG. 8 gives a table that facilitates comparison of Embodiment 3 with the conventional methods (namely, the pattern integration and the random field method) from various viewpoints. As shown in the table, according to Embodiments of the present invention, a great number of sensors are arranged over all solid angles, the sensors being fixed (non-movable), wherein scanning is not performed. According to the pattern integration method, one sensor scans, and a radio terminal has to be rotationally moved. According to the random field method, one sensor is fixed at a specific position, and scanning is unnecessary. According to the present invention, the measuring time is short; the conventional methods require a long time. According to the present invention, power measurement is easy even when a human body and other objects are present in the surrounding environment, since the measuring object such as the radio terminal does not have to be rotated, unlike the case of the pattern integration method, and the like. Embodiments require that the measurement be performed within an anechoic chamber, where the indoor surface of a wall is covered with a radio wave absorber, in order to maintain the measurement precision of a reflected wave.

Figure 9:
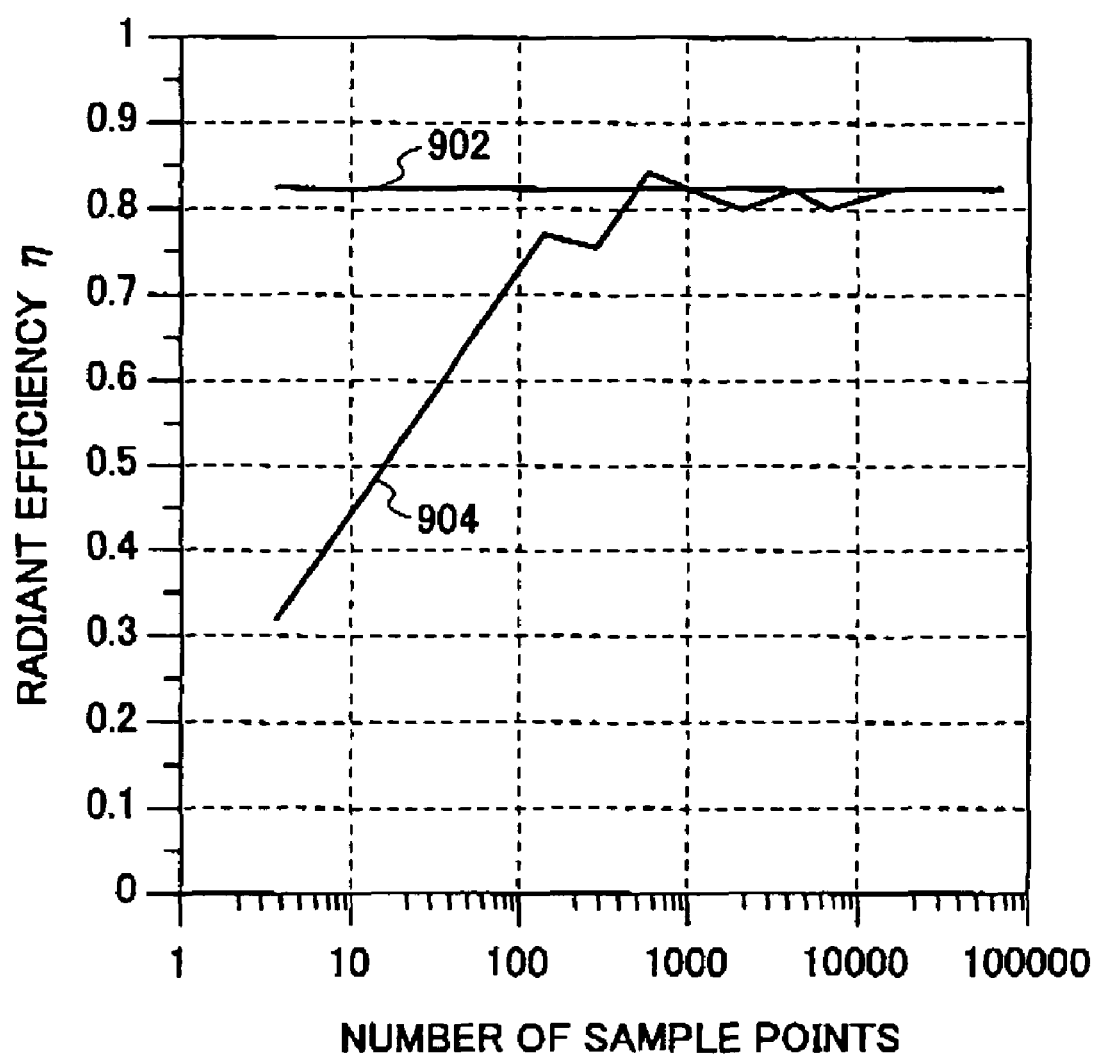
FIG. 9 is a graph showing a simulation result comparing the technique of the embodiment of the present invention with the conventional method.

FIG. 9 shows a result of simulation wherein the technique of the pattern integration method (conventional method) is compared with Embodiment 3 of the present invention. In FIG. 9, the horizontal axis represents the number of samples, from which an average is obtained, of the synthetic instantaneous signal output by the random RF compounding unit 606, and the vertical axis represents the radiant efficiency η that is computed. The graph shown by a reference number 902 represents the calculation result by the pattern integration method, wherein the radiant efficiency is correctly computed even when the number of the samples is small. However, measurement takes a long time. On the other hand, the graph shown by a reference number 904 represents the calculation result according to Embodiment 3. Accuracy of the radiant efficiency improves as the number of samples, which are to be averaged, increases, and converges at 10000 sample points (an error is settled to less than 1%). According to Embodiment 3, since the synthetic signal E(t) is instantly obtained, power measurement can be managed in a short time. In the case, for example, wherein 10000 sample points are to be averaged, a measurement sampling frequency is set at 100 kHz, and data are taken in by a digital oscilloscope, so that the acquisition time of measured values can be managed in 100 ms. If the data are updated every second, a power value and radiant efficiency can be measured almost in real time. As described above, Embodiment 3 is highly advantageous to designing and evaluating an apparatus that transmits a radio wave such as a radio terminal.

The power measurement according to the present Embodiment is widely applicable to a variety of needs of radiation power measurement a radio terminal, not only for determining the weight as described with Embodiments 1 and 2. For example, the technique of Embodiment 3 is applicable to inspection to determine whether radiation power of a radio terminal is within a predetermined requirement (for example, inspection to determine whether a radio wave exceeding 0.8 W is output).

According to Embodiment 3, since the radiation power and radiant efficiency of a radio terminal can be measured at ultra high-speed, working efficiency, such as design efficiency of the radio terminal, and quality evaluation can be remarkably raised.

Embodiment 4

Figure 10:
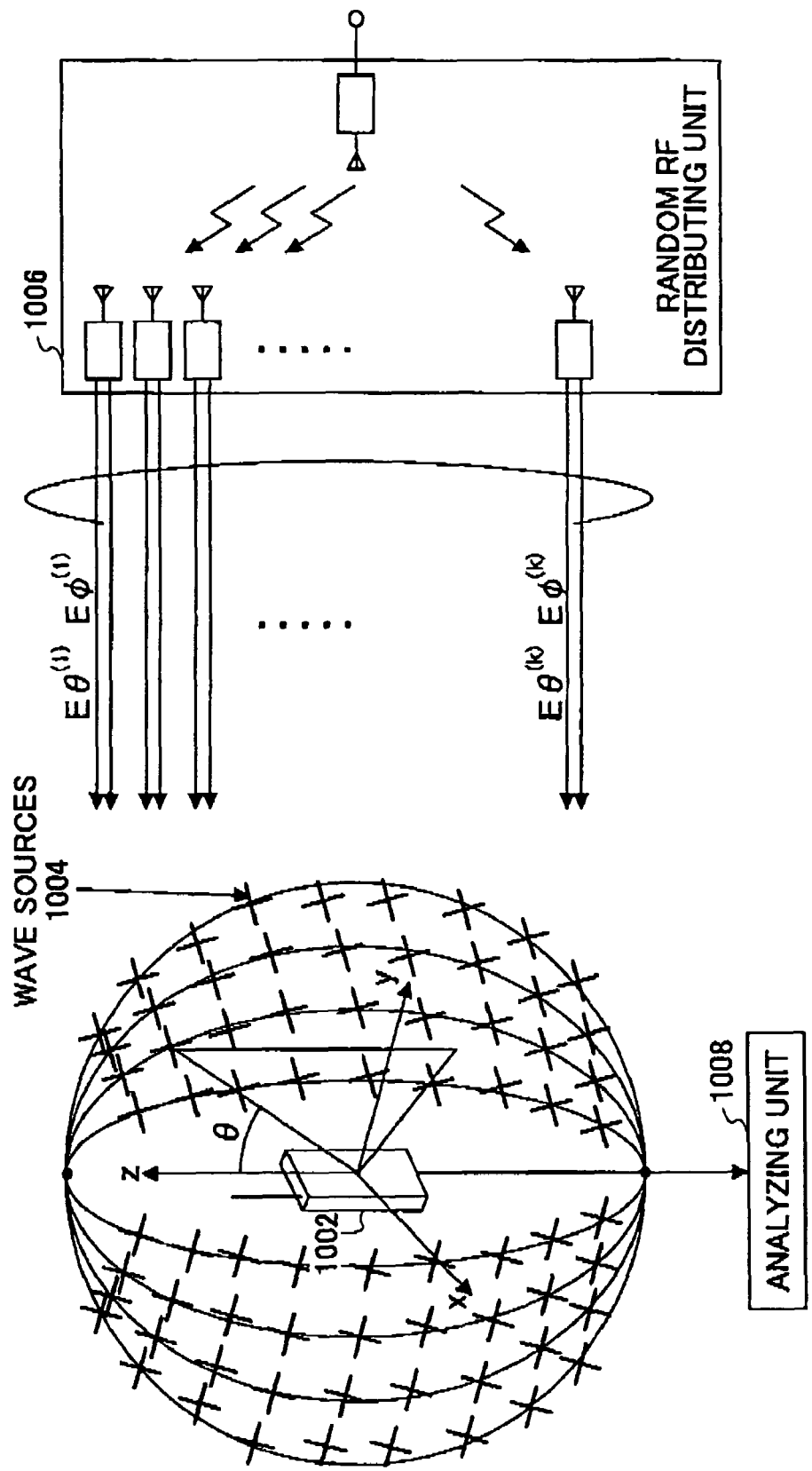
FIG. 10 is a perspective/block diagram showing a radiation power measuring system according to the embodiment of the present invention.

FIG. 10 shows the radiation power measuring system for measuring the radiation power according to Embodiment 4 of the present invention. In this Embodiment, relations between transmission and reception of a signal are reversed with reference to Embodiment 3. In Embodiment 4, the radiant efficiency, etc., of a radio wave are computed using the reversible property of transmission and reception. The radiation power measuring system of Embodiment 4 includes a radio terminal 1002, wave sources 1004, a random RF distributing unit 1006, and an analyzing unit 1008.

The radio terminal 1002 receives radio waves emitted from the wave sources 1004, and provides received signals to the analyzing unit 1008.

The wave sources 1004 are formed on a spherical surface that surrounds the radio terminal 1002. Each of the wave sources 1004 carries out radio transmission of the radio wave towards the radio terminal 1002 according to the signal received from the random RF distributing unit 1006. The signal transmitted by each of the wave sources 1004 is detected by the electric-field-vector components, namely, a horizontally polarized wave (Eφ) and a vertically polarized wave (Eθ). In FIG. 10, the wave sources 1004, which number K, are served by orthogonal sensors and receive 2K signals $(E\theta^{(1)}, E\phi^{(1)}, \ldots, E\theta^{(K)}, E\phi^{(K)})$.

Here, the wave sources 1004 do not have to be arranged over all the solid angles centering on the radio terminal 1002, but may be arranged such that they cover only a part of the solid angles.

The random RF distributing unit 1006 is connected to the wave sources 1004 by wires. The 2K signals correspond to signals received by K antennas of the random RF distributing unit 1006. In the random RF distributing unit 1006, the signal is wirelessly transmitted from a certain node, and received by K antennas (distribution). For example, the first antenna receives the radio signal expressed by $(E\theta^{(1)}$ and $E\phi^{(1)})$. Similarly, the n-th antenna receives the radio signal expressed by $(E\theta^{(n)}$ and $E\phi^{(n)})$. At this juncture, fading is introduced (like the random RF compounding unit 606 of FIG. 6) so that the radio signal may be distributed with a randomized weight.

Figure 11:
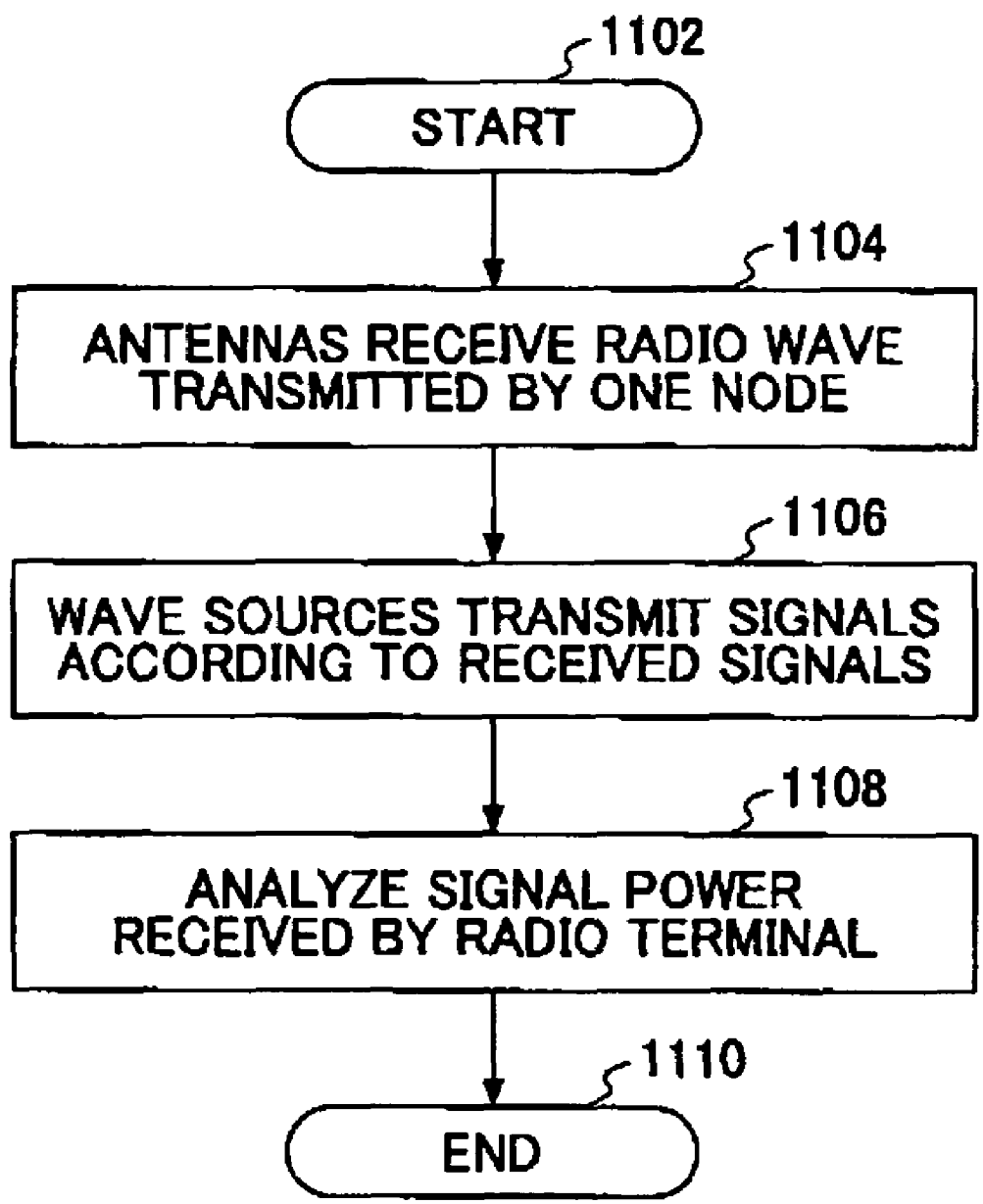
FIG. 11 is the flowchart showing an operation of the radiation power measuring system shown in FIG. 10.

FIG. 11 is a flowchart showing the operation of the radiation power measuring system according to Embodiment 4. The process starts with Step 1102, and progresses to Step 1104.

At Step 1104, the node of the random RF distributing unit transmits a radio signal, which is received by K antennas. The disturbance representing fading is introduced so that the radio signal may be distributed to K antennas with random weights.

At Step 1106, each of the wave sources 1004 corresponding to each of K antennas transmits a signal towards the radio terminal 1002 according to the signal $(E\theta^{(n)}, E\phi^{(n)})$ received from the random RF distributing unit 1006. This transmission is simultaneously performed from K antennas.

The signal received at the radio terminal 1002 is measured and analyzed by the analyzing unit 1008 at Step 1108, and the process progresses to and ends with Step 1110.

Further, the present invention is not limited to these embodiments, but variations and modifications may be made without departing from the scope of the present invention.

The present application is based on Japanese Priority Applications No. 2004-142717 filed on May 12, 2004 and No. 2004-171820 filed on Jun. 9, 2004 with the Japanese Patent Office, the entire contents of which are hereby incorporated by reference.

What is claimed is:

1. A weight determining apparatus comprising:
a plurality of antenna elements provided to a mobile terminal, said antenna elements receiving a test wave transmitted by a plurality of test wave sources arranged on a spherical surface surrounding a phantom that simulates an object that attenuates a radio wave, wherein each test wave source is a random wave source that transmits a test wave polarized in one direction at a given instant, but performs isotropic radiation if a time average is taken; and
a weight determining unit configured to determine the weight of each of said antenna elements such that received power of signals received by said antenna elements as a whole is maximized.

2. The weight determining apparatus as claimed in claim 1, wherein the signal received by said antenna elements is a signal transmitted by one of the test wave sources prepared outside of the phantom, the test wave source being movable.

3. The weight determining apparatus as claimed in claim 1, wherein the signal received by said antenna elements is a signal transmitted by plural of the test wave sources prepared outside of the phantom, the test wave sources being fixed.

4. A weight determination method, comprising:
a step of transmitting a test wave from a plurality of test wave sources arranged on a spherical surface surrounding a phantom that simulates an object that attenuates a radio wave, wherein each test wave source is a random wave source that transmits a test wave polarized in one direction at a given instant, but performs isotropic radiation if a time average is taken;

a step of receiving the transmitted test wave by a plurality of antenna elements of a mobile terminal; and a step of determining a weight of each of the antenna elements such that received power of signals received by said antenna elements as a whole is maximized.

5. A radiation power measuring apparatus, comprising:

a plurality of wave sources arranged on a spherical surface surrounding a radio terminal, wherein each wave source is a random wave source that transmits a wave polarized in one direction at a given instant, but performs isotropic radiation if a time average is taken;

a distributing unit connected to said wave sources; and an analyzing unit to analyze power of a signal received by the radio terminal; wherein a signal input to the distributing unit is wirelessly transmitted, the signal is received by a plurality of antennas arranged one of the antennas corresponding to each of said wave sources, and said wave sources transmit radio signals according to the signal provided by the distributing unit.

* * * * *